Dec. 18, 1923.

H. J. McGOWAN 1,477,971

GAS HOT PLATE

Filed April 5, 1922

INVENTOR.
Hugh J. McGowan
BY
H. Anderson
ATTORNEY.

Patented Dec. 18, 1923.

1,477,971

UNITED STATES PATENT OFFICE.

HUGH J. McGOWAN, OF PEEKSKILL, NEW YORK, ASSIGNOR TO SOUTHARD ROBERTSON COMPANY, OF PEEKSKILL, NEW YORK.

GAS HOT PLATE.

Application filed April 5, 1922. Serial No. 549,756.

*To all whom it may concern:*

Be it known that I, HUGH J. McGOWAN, a citizen of the United States, residing at Peekskill, in the county of Westchester and State of New York, have invented new and useful Improvements in Gas Hot Plates, of which the following is a specification.

This invention relates to gas stoves, and particularly to what are known as hot plates, and especially to those made for connection with service pipes by flexible tubes. Its main object is to afford a means for applying a flexible tube in an out-of-the-way manner that removes its liability to accidental displacement. A secondary advantage of the invention, is, that it simplifies making metal pipe connection with service pipes. These objects are attained by the means set forth in this specification and the accompanying drawings, in which—

Figure 1:
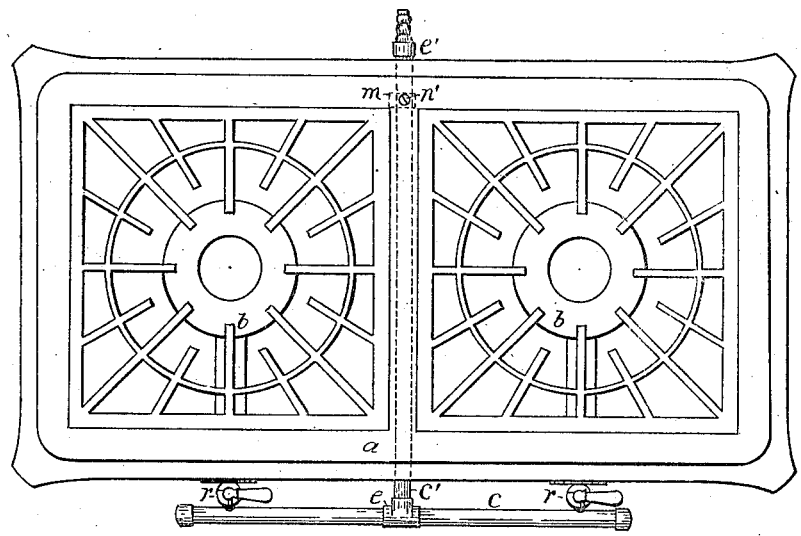
Figure 2:
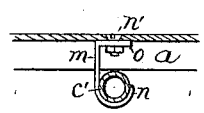
Figure 3:
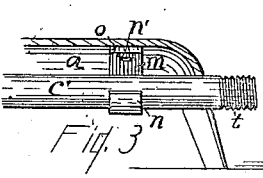
Figure 4:
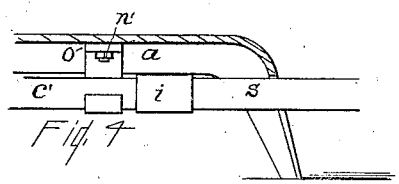

Fig. 1 is a plan of a hot plate embodying this invention. Fig. 2 is an enlarged elevation in section of the pipe hanger. Fig. 3 is an enlarged detail in section relating to the hanger. Fig. 4 is an enlarged section in elevation showing the invention with a metallic pipe connection with the service pipe.

In Fig. 1 a hot plate is represented at $a$, with the usual burners $b$ $b$, gas cocks $r$ $r$ and front gas connecting pipe $c$. It is usual to attach a nozzle, as $e'$, Fig. 1, for a flexible tube connection, to one or the other end of the pipe $c$.

In this invention a branch pipe $c'$ is inserted in the pipe $c$ by any suitable means, one such being shown to be a T $e$. Of course the connection can be made with any part of the pipe $c$, the intention being to convey to the rear side of the hot plate the means for connecting the hot plate with the gas service pipe. In the construction shown the branch pipe is a straight section, extending rearwardly from the T, and the flexible tube nozzle $e'$ is on the rear end of the pipe, outside the frame of the hot plate.

As a convenient means for supporting the extended branch pipe $c'$, a hanger is employed, as $m$ $n$, in all the figures. In Figs. 2, 3 and 4 the hangers are shown to comprise a flanged top $o$, securable to the hot plate frame by a screw $n'$, and a hook end $n$ which grasps the pipe. Fig. 3 is a side elevation of the hanger and the pipe $c'$, the threaded outer end $t$ of the pipe adapted to receive either a nozzle, as $e'$, Fig. 1, or a coupling connection as at $i$, Fig. 4, with the service pipe $s$.

Fig. 4 also shows how the service connection can be made within the limits of the frame of the hot plate. It is obvious that the nozzle $e'$ can be attached in the place of the coupling $i$, thus placing the flexible tube nozzle within the limits of the frame of the hot plate.

There is no end to the various ways of reaching a given point in pipe fitting, so the construction herein shown can be variously altered, but the idea in this invention is, to get the flexible tube connection away from the front of the hot plate.

What I claim and desire to secure by Letters Patent, is—

The combination in a hot plate with the frame of the hot plate, of a gas feed pipe extending from the rear to the front of the hot plate, the said supply pipe branching across the front of the hot plate said branches extending rearwardly to the burners, and a clamp hanger depending from the hot plate to secure and support the free end of the said gas supply pipe.

HUGH J. McGOWAN.